March 31, 1959     A. W. BEEMAN ET AL     2,879,680
JAW OPERATING MEANS FOR POWER TONGS
Filed Dec. 9, 1957                                                  2 Sheets-Sheet 1
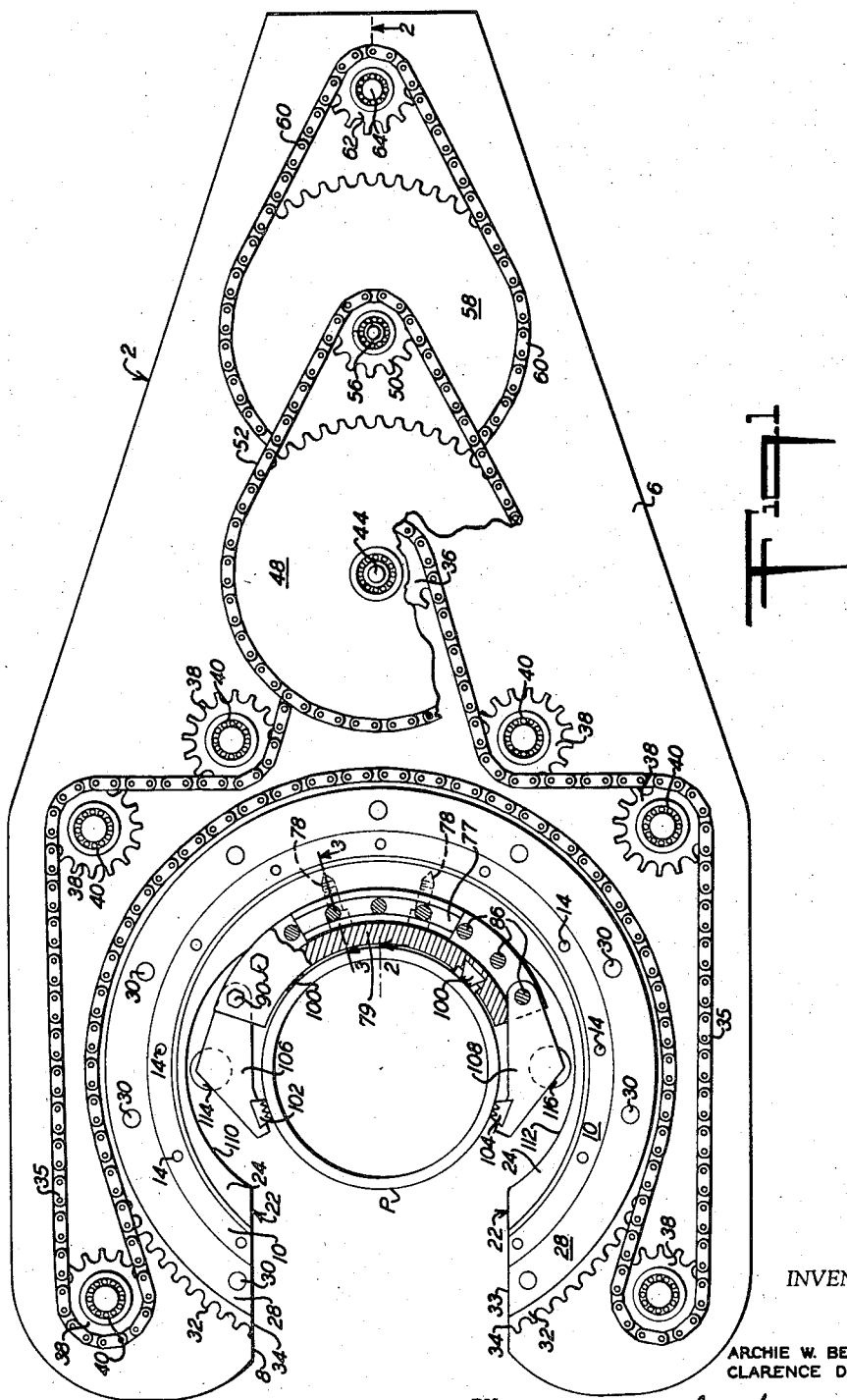
INVENTORS
ARCHIE W. BEEMAN
CLARENCE D. NEW
BY
*Swecker + Mathis*
ATTORNEYS

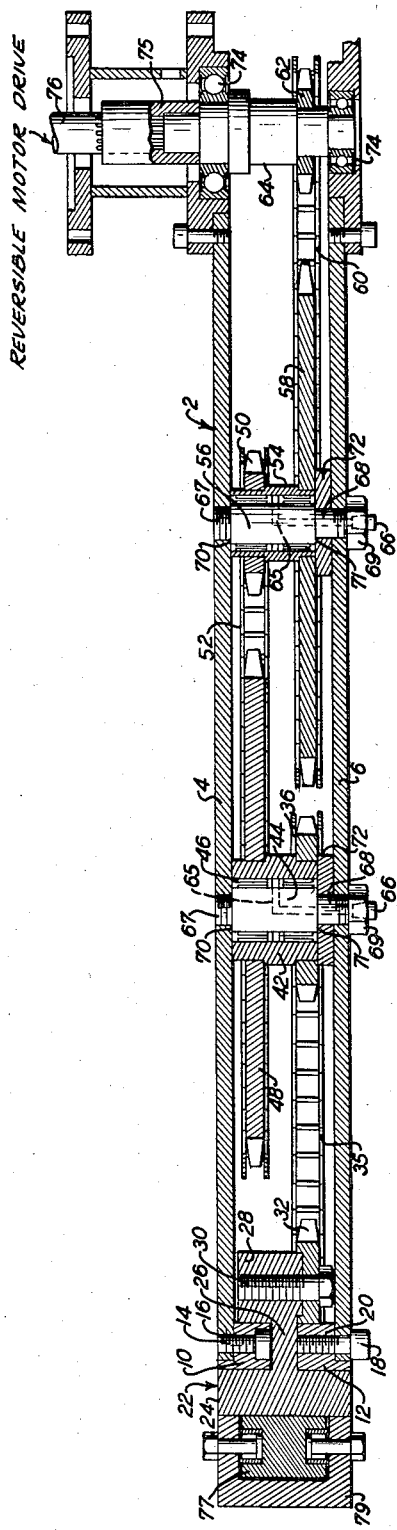
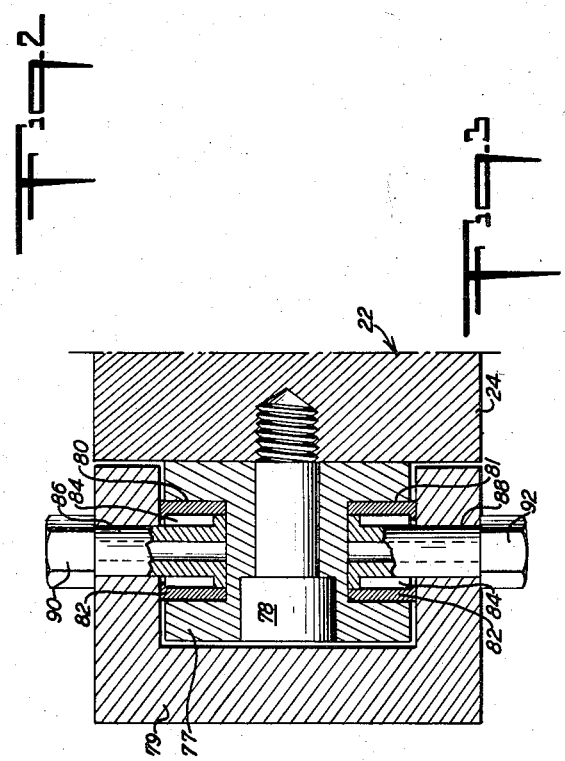

United States Patent Office 2,879,680
Patented Mar. 31, 1959

2,879,680

JAW OPERATING MEANS FOR POWER TONGS

Archie W. Beeman and Clarence D. New, Odessa, Tex.

Application December 9, 1957, Serial No. 701,408

7 Claims. (Cl. 81—53)

This invention relates to power tongs of the type commonly used in oil fields for making and breaking threaded connections between pipes, cylindrical drilling tools, and the like.

In oil field operations it frequently is necessary to connect or disconnect the ends of long sections of large diameter pipes, and in many instances such connections are established by means of threaded joints. As an example, drill pipes customarily constitute a series of long pipe sections threadedly connected at their adjacent ends. Since these pipe sections are very heavy and since they have large outside diameters, special equipment is required in order to rotate them relative to each other in making or breaking the threaded connections between adjacent sections. Power tongs are well suited to this type of service. A typical power tong includes some means for firmly gripping the external surface of a pipe section and means for rotating the pipe section while so gripped.

A number of tong constructions have been proposed heretofore, but these have been complicated and expensive pieces of equipment. The pipe-gripping means employed in these prior constructions have been particularly elaborate, and the presence of large numbers of relatively movable parts has adversely affected the reliability of such equipment.

An object of this invention is to overcome the foregoing objections and to provide an inexpensive power tong construction which will efficiently make or break threaded pipe joints without endangering the lives of the working crewmen.

Another object of this invention is to simplify the construction of power tongs so that they will be easier to operate and to maintain.

These objects are realized in a power tong construction which includes an elongated frame having a pipe-gripping mechanism at one end and a power unit at the other. Power is transmitted from the power unit to the pipe-gripping mechanism through a series of roller chain and sprocket combinations which serve as speed-reduction means.

The pipe-gripping mechanism cooperates with a throat in the end of the frame for the reception of a pipe section to be rotated. It includes a partial ring rotatably mounted upon the frame of the tong and having an opening which may be aligned with the throat so that the pipe section may be disposed within the ring. This ring may be driven in either direction by a roller chain cooperating with a sprocket fixed to the ring and connected to the speed-reducing means.

Disposed within the partial ring of the pipe-gripping mechanism is a die carrier which is normally rotatable relative to the ring. Dies are mounted upon this die carrier in position to grip the external surface of a pipe section which is to be rotated. Certain of such dies are mounted for radial movement relative to the die carrier and are arranged to cooperate with cam surfaces on the partial ring so that, when the ring is rotated relative to the die carrier, these dies are moved radially into firm engagement with the pipe section. After the movable dies have engaged the pipe section, the parts bind to prevent further relative movement between the ring and the die carrier. As a result, the pipe section is rotated as required to make or break a threaded joint at its end.

A better understanding of the invention will be gained from consideration of the following detailed description of an embodiment thereof illustrated in the accompanying drawings, in which:

Fig. 1 is a plan view of a power tong according to the invention, with the top plate of the frame removed and with certain parts being broken way to illustrate features of the construction;

Fig. 2 is a vertical cross sectional view taken along the line 2—2 in Fig. 1; and Fig. 3 is an enlarged vertical cross sectional view taken along the line 3—3 in Fig. 1.

The main frame of the illustrated power tong construction has been designated generally by the numeral 2. It includes the top wall 4 and a bottom wall 6 held in spaced apart relation by any suitable means. The frame 2 also may include side walls to protect the internal mechanisms against the entrance of dirt and other foreign materials, but these side walls have been omitted from the drawings in the interest of clarity.

At its front end the frame 2 is provided with a throat 8 through which a pipe section P may pass into cooperative relationship with respect to a pipe-gripping mechanism to be described in greater detail below. It will be understood as the description proceeds that the term "pipe section" is used herein in a generic sense, to refer to bodies of various kinds having generally cylindrical exterior surface portions which may be gripped by the tong. Such bodies may be sections of drill pipe, casing, tubing, rods, tools, etc.

Mounted upon the frame 2 adjacent the throat 8 are upper and lower arcuate bearing members 10 and 12 (Fig. 2). The upper bearing member 10 is fixed rigidly to the forward edge of the top plate 4 of the frame 2 by means of a plurality of screws 14 cooperating with threaded holes 16 in the top member, and the lower bearing member 12 is secured rigidly to the bottom plate 6 in a similar manner by screws 18 cooperating with threaded holes 20 in the lower bearing member 12. As best shown in Fig. 1, the upper bearing member 10 is interrupted at the throat 8 of the frame 2 to prevent interference with the passage of the pipe section P into the pipe-gripping mechanism. It will be understood, of course, that the lower bearing member 12 is similarly interrupted.

The pipe-gripping mechanism is supported entirely by the bearing members 10 and 12. It includes a partial ring 22 having a front portion 24 bearing against the front faces of the bearing members 10 and 12, a web portion 26 disposed between and bearing against the adjacent horizontal faces of the upper and lower bearing members 10 and 12, and a rear portion 28 bearing against the rear face of the upper bearing member 10. Secured rigidly by screws 30 to the rear portion 28 of the partial ring 22 is a sprocket 32, the forward edge of which bears against the rear face of the lower bearing member 12.

Referring particularly to Fig. 1, it will be seen that the partial ring 22 and the sprocket 32 include gaps or openings 33 and 34 which are comparable in extent to the throat 8 of the frame 2. These openings 33 and 34 are brought into alignment with the throat 8 during movement of the pipe section P into or out of the tong.

The partial ring 22 may be rotated relative to the frame 2 by means of a roller chain 35 which engages the periphery of the sprocket 32 and is driven by a sprocket 36. The path of the drive chain 35 is established by suitable idler sprockets 38 mounted upon the frame 2. If desired, certain or all of these idler sprockets 38 may be adjustably mounted upon the frame 2 so that slack in the drive chain 34 may be removed by slight changes in their positions. As indicated in Fig. 1, it is preferred that each of the idler sprockets 38 be mounted upon antifriction bearings 40, but this is not essential in all cases.

The drive sprocket 36 is carried by a sleeve 42 rotatably mounted upon a bearing post 44 by suitable antifriction bearings 46. The upper end portion of the sleeve 42 carries a sprocket 48 of greater diameter than the drive sprocket 36. Since both of these sprockets 36 and 48 are secured rigidly to the sleeve 42, they must rotate as a unit and the peripheral speed of the large sprocket 48 is considerably greater than the peripheral speed of the smaller drive sprocket 36. It will be seen therefore that the sleeve 42 and the two sprockets 36 and 48 constitute a reliable and simple speed-reducing means for the drive system of the power tong of this invention.

The sprocket 48 is driven through a similar speed-reducing means disposed rearwardly thereof along the frame 2. This second speed-reducing means includes a small sprocket 50 connected to the large sprocket 48 by a roller chain 52, a sleeve 54 rotatably mounted upon a rigid post 56, and a large sprocket 58. The large sprocket 58 is driven through a roller chain 60 by a small sprocket 62 carried by a drive shaft 64 at the rear end of the frame 2.

It is preferred that the bearing posts 44 and 56 be provided with channels 65 leading from lubricant fittings or nipples 66 at the exterior of the frame 2. This arrangement greatly simplifies the maintenance operations required in order to keep the equipment in good condition.

Attention also is invited to the fact that in the illustrated construction the bearing posts 44 and 56 serve the additional purpose of increasing the rigidity of the frame 2. Each of the posts 44 and 56 has a threaded upper end portion 67 detachably connected to the top wall 4 of the frame 2, and a threaded lower end portion 68 for receiving a nut 69 which bears against the lower face of the bottom wall 6 of the frame 2. Disposed immediately below the threaded upper portion 67 of each of the bearing posts is a shoulder 70 in position to bear against the lower face of the top wall 4. Similarly, a shoulder 71 adjacent the lower threaded portion 68 of each bearing post bears against a washer 72 resting upon the upper face of the bottom wall 6 of the frame 2. When the nuts 69 are tightened, therefore, the spacial relationship between the top and bottom walls 4 and 6 is fixed.

The bearing posts for the idler sprockets 38 preferably are of similar construction, and if desired, the several bearing posts may constitute the sole means for connecting together the top and bottom walls 4 and 6 of the frame 2.

The drive shaft 64 is mounted in suitable bearings 74 and is provided with a coupling 75 at its upper end which may serve to connect the shaft 64 to a motor shaft 76. The motor has not been illustrated in the drawings, but it will be understood that such motor may be of any of the conventional types. Ordinarily, an hydraulic motor will be found to be preferable for this purpose, because a motor of this type may be controlled easily and it will deliver high starting torques. The motor selected should be capable of turning its shaft 76 in either direction.

The front face of the front portion 24 of the partial ring 22 carries a short, arcuate bearing rail 77 secured thereto by screws 78. This bearing rail 77 serves as a support for a channel-shaped die carrier 79, and to this end it is provided with arcuate grooves 80 and 81 in its upper and lower surfaces, respectively. The grooves 80 and 81 receive cylindrical bearing sleeves 82 rotatably mounted upon roller bearings 84 carried by the inner ends of stub shafts 86 and 88. Nuts 90 and 92 threadedly engage the outer end portions of the stub shafts 86 and 88 and cooperate with the bearing sleeves 82 to clamp the stub shafts 86 and 88 to the upper and lower walls of the die carrier 79.

This construction permits the die carrier 79 to move freely along the bearing rail 77, and yet provides an effective support for the die carrier 79. Since the bearing sleeves 82 engage the walls of the grooves 80 and 81 in the bearing rail 77 from opposite directions, tilting of the die carrier 79 is prevented. Therefore, it can move only in a circular path about the axis of rotation of the partial ring 22.

Fixed rigidly to the front face of the die carrier 79 are a pair of pipe-engaging dies 100. As illustrated, the dies 100 are hard steel bodies and are provided with serrated front faces. The serrations provide a large number of edges which serve effectively to grip the pipe section P and to prevent rotation of the die carrier 79 relative to a pipe section P.

The die carrier 79 also has connected thereto two movable dies 102 and 104. These are mounted upon links 106 and 108 carried by the endmost stub shafts 86 and 88 on the die carrier 79. The links 106 and 108 are free to pivot about the axes of the stub shafts so as to bring the dies 102 and 104 into and out of gripping engagement with the exterior surface of the pipe section P.

The inner surface of the front portion 24 of the partial ring 22 is provided with two arcuate depressions 110 and 112 disposed adjacent the links 106 and 108 and serving as cam surfaces for urging the movable dies 102 and 104 into gripping engagement with the pipe section P. If desired, the links 106 and 108 may be provided with rotatable cam followers 114 and 116 for cooperation with the cam surfaces 110 and 112.

A brief description of the mode of operation of the tong of this invention may be helpful. It will be understood that initially the openings 33 and 34 in the partial ring 22 and the sprocket 32 are aligned with the throat 8 in the frame 2 so that the pipe section P may be inserted into the interior of the partial ring 22. When so inserted, the exterior surface of the pipe section P comes into contact with the serrated edges of the fixed dies 100 on the die carrier 79, and the axis of the pipe section P is approximately coincident with the axis of rotation of the partial ring 22. After the pipe section P is in position, power is applied to the motor shaft 76 to rotate the partial ring 22 in either direction. As an example, it may be assumed that the motor shaft 76 is rotated so as to cause the partial ring 22 to move in a clockwise direction in Fig. 1.

As the ring 22 begins to rotate in a clockwise direction from the position shown in Fig. 1, the die carrier 79 will remain stationary, because of the engagement of the fixed dies 100 with the exterior of the pipe section P. Therefore, the cam surfaces 110 and 112 on the front portion 24 of the partial ring 22 will move relative to the cam followers 114 and 116 on the links 106 and 108 which carry the movable dies 102 and 104. Upon continued rotation of the ring 22, the cam surface 110 will cause the link 106 to swing in a counterclockwise direction about the stub shafts 86 and 88 upon which it is mounted, and the cam surface 112 will cause the link 108 to swing in a clockwise direction about its stub shafts 86 and 88. These movements of the links 106 and 108 bring the movable dies 102 and 104 into gripping engagement with the surface of the pipe section P.

After the dies 102 and 104 are brought into contact with the pipe section P, further relative movement between the cam followers 114, 116, and the cam surfaces 110, 112, is not possible. Since the links 106 and 108 cannot swing any further, the parts bind, and the die carrier 79 begins to rotate with the ring 22. The pipe section P, being fixed by the dies 100, 102, and 104, against relative movement with respect to the die carrier 79, also begins to rotate in a clockwise direction. Such rotation may be continued for as many revolutions as may be required in order to make or break a threaded connection between an end of the pipe section P and another pipe section disposed in alignment therewith.

After the pipe section P has been rotated sufficiently, the tong may be freed from the pipe section P by rotating the ring 22 a short distance in a counterclockwise direction, to position the low points of the cam surfaces 110 and 112 opposite the cam followers 114 and 116, respectively. With the parts in such positions, the movable dies 102 and 104 may be disengaged from the pipe section P, and the tong may be moved rearwardly slightly to free the fixed dies 100 from contact with the surface of the pipe section P. Thereafter, the ring 22 may be rotated in either direction to position its opening 33 in alignment with the throat 8 of the tong so that the pipe section P may pass out of the tong.

Particular attention should be given the arrangement of the dies 100, 102, and 104 about the axis of rotation of the ring 22. Referring to Fig. 1 it will be seen that a circle about this axis may be divided into four quadrants by the center line of the opening 33 in the ring 22 and a line passing through the axis of rotation in a direction perpendicular to such center line. The fixed dies 100 are located in adjacent ones of these quadrants and are disposed opposite the opening 33. The movable dies 102 and 104 are located in the other quadrants of the circle, and the links 106 and 108 are so mounted that the cam surfaces 110 and 112 urge these movable dies 102 and 104 in approximately radial directions. In this construction the movable dies 102 and 104 actually serve a dual purpose. They not only grip the pipe section P themselves, but they also urge the pipe section P into engagement with the fixed dies 100.

As will be apparent, the tong also is capable of rotating the pipe section P in a counterclockwise direction when desired. In order to accomplish this result, the tong is operated in a manner substantially the same as that described above. The only differences are that the motor shaft 76 is rotated in the opposite direction and that different portions of the cam surfaces 110 and 112 on the partial ring 22 cooperate with the cam followers 114 and 116. When the pipe section P is to be rotated in a clockwise direction, a forward portion of the cam surface 110 and a rearward portion of the cam surface 112 are active, whereas, when the pipe section P is to be rotated in a counterclockwise direction, a rearward portion of the cam surface 110 and a forward portion of the cam surface 112 are active.

Although one embodiment of the invention has been illustrated and described in detail, various alternatives and modifications will be apparent to persons skilled in the art. It is intended, therefore, that the foregoing description be considered as exemplary only, and that the scope of the invention be ascertained from the following claims.

We claim:

1. A power tong for rotating a pipe comprising a frame having a throat for the reception of a pipe, said frame including top and bottom members spaced from each other and terminating at said throat, an arcuate lower bearing member fixed to said bottom member adjacent said throat, an arcuate upper bearing member fixed to said top member adjacent said throat above and spaced from said lower bearing member, partial ring means bearing against the vertical faces of said bearing members and including a portion disposed between and contacting the adjacent faces of said bearing members, means for rotating said partial ring means relative to said bearing members, and pipe-gripping means carried by said partial ring means in position to engage the surface of a pipe disposed within said throat so as to rotate the pipe upon rotation of said partial ring means.

2. A power tong for rotating a pipe comprising a frame having a throat for the reception of a pipe, said frame including top and bottom members spaced from each other and terminating at said throat, an arcuate lower bearing member fixed to said bottom member adjacent said throat, an arcuate upper bearing member fixed to said top member adjacent said throat above and spaced from said lower bearing member, partial ring means bearing against the inner and outer vertical faces of said bearing members and including a portion disposed between and contacting the adjacent faces of said bearing members, sand partial ring means being provided with an opening therein which may be brought into alignment with said throat so that the pipe may be disposed within said ring means, a sprocket fixed to said partial ring means inwardly of said bearing members and having an opening therein in alignment with said opening in said ring means, a drive chain engaging a portion of the periphery of said sprocket spaced from said throat for rotating said partial ring means relative to said bearing members, and pipe-gripping means carried by said partial ring means in position to engage the surface of a pipe disposed within said partial ring means so as to rotate the pipe upon rotation of said partial ring means.

3. A power tong for rotating a pipe comprising a frame having a throat for the reception of a pipe, a partial ring rotatably mounted on said frame and having a side opening therein which may be brought into alignment with said throat so that a pipe may be disposed within said ring, means for rotating said ring about its central axis, die means carried by said ring at a location opposite said opening, said ring being provided with a cam surface movable therewith, and means movable by said cam surface upon rotation of said ring for bearing against a pipe disposed within said ring in such a direction as to cause said die means to grip said pipe.

4. A power tong for rotating a pipe comprising a frame having a throat for the reception of a pipe, a partial ring rotatably mounted on said frame and having a side opening therein which may be brought into alignment with said throat so that a pipe may be disposed within said ring, the inner surface of said ring including a pair of cam surfaces disposed on opposite sides of the center line of said opening, the centerline of said opening and a line perpendicular thereto and passing through the axis of said ring dividing a circle about said axis into four quadrants, an arcuate die carrier rotatably mounted upon said ring and being disposed with the two quadrants of said circle opposite said opening in said ring, a first pair of dies fixed to said carrier and disposed respectively in said two quadrants, a second pair of dies mounted on said carrier for movement in generally radial directions and disposed respectively in the two quadrants of said circle adjacent said opening in said ring, and means cooperating with the dies of said second pair and with said cam surfaces to move said dies of said second pair radially inwardly upon rotation of said ring relative to said carrier.

5. A power tong for rotating a pipe comprising a frame having a throat for the reception of a pipe, a partial ring rotatably mounted on said frame and having a side opening therein which may be brought into alignment with said throat so that a pipe may be disposed within said ring, the inner surface of said ring including a pair of arcuate depressions which form cam surfaces disposed on opposite sides of the center line of said opening, means for rotating said ring about its central axis, a bearing rail fixed to the inner surfaces of said ring at a location opposite said opening and having grooves in its upper and lower surfaces, an arcuate channel-shaped die carrier mounted upon said bearing rail for rotation relative to said ring and being provided with bearing means projecting into said grooves, a pair of link means pivotally connected to the ends of said carrier and including portions projecting into said arcuate depressions in the inner surface of said ring, a first pair of pipe-gripping dies fixed to said carrier, and a second pair of pipe-gripping dies fixed to said link means.

6. A power tong for rotating a pipe comprising a frame having a throat for the reception of a pipe, a partial ring rotatably mounted on said frame and having a side opening therein which may be brought into alignment with said throat so that a pipe may be disposed within said ring, the inner surface of said ring including a pair of arcuate depressions which form cam surfaces disposed on opposite sides of the center line of said opening, means for rotating said ring about its central axis, a bearing rail fixed to the inner surface of said ring at a location opposite said opening and having grooves in its upper and lower surfaces, an arcuate channel-shaped die carrier mounted upon said bearing rail for rotation relative to said ring and being provided with bearing means projecting into said grooves, a pair of link means pivotally connected to the ends of said carrier, a rotatable cam follower carried by each of said link means and projecting into said arcuate depressions in the inner surfaces of said ring so that, upon rotation of said ring relative to said carrier in either direction, said link means are pivoted to move portions thereof closer to the axis of rotation of said ring, a first pair of pipe-gripping dies fixed to said carrier in position to engage a pipe disposed within said ring, and a second pair of pipe-gripping dies fixed to said portions of said link means in position to press against the surface of the pipe under the influence of said cam surfaces and to urge said pipe toward said first pair of dies.

7. A power tong for rotating a pipe comprising a frame having a throat for the reception of a pipe, a partial ring rotatably mounted on said frame and having a side opening therein which may be brought into alignment with said throat so that a pipe may be disposed within said ring, means for rotating said ring about its central axis, die means carried by said ring at a location opposite said opening, said ring being provided with cam surfaces disposed on opposite sides of the center line of said opening, a pair of die means each disposed approximately 90 degrees from said first-mentioned die means and on opposite sides of said center line of said opening, rotation of said ring causing said cam surfaces to engage said pair of die means to move said pair of die means inwardly to grip said pipe on opposite sides thereof for sequential turning movement of said pipe.

References Cited in the file of this patent

UNITED STATES PATENTS

| | | |
|---|---|---|
| 2,305,624 | Lange et al. | Dec. 22, 1942 |
| 2,550,045 | De Hetre | Apr. 24, 1951 |
| 2,618,468 | Lundeen | Nov. 18, 1952 |
| 2,650,070 | Lundeen | Aug. 25, 1953 |
| 2,703,221 | Gardner | Mar. 1, 1955 |
| 2,737,839 | Paget | Mar. 13, 1956 |
| 2,741,460 | Gardner | Apr. 10, 1956 |
| 2,760,392 | Paget | Aug. 28, 1956 |